US010263481B2

(12) United States Patent
Roberts

(10) Patent No.: US 10,263,481 B2
(45) Date of Patent: Apr. 16, 2019

(54) ELECTRIC MOTOR OR GENERATOR

(71) Applicant: PROTEAN ELECTRIC LIMITED, Surrey (GB)

(72) Inventor: Gareth Roberts, South Heighton (GB)

(73) Assignee: PROTEAN ELECTRIC LIMITED (GB)

( * ) Notice: Subject to any disclaimer, the term of this patent is extended or adjusted under 35 U.S.C. 154(b) by 351 days.

(21) Appl. No.: 14/896,378

(22) PCT Filed: Jun. 6, 2014

(86) PCT No.: PCT/IB2014/062011
§ 371 (c)(1),
(2) Date: Dec. 5, 2015

(87) PCT Pub. No.: WO2014/199267
PCT Pub. Date: Dec. 18, 2014

(65) Prior Publication Data
US 2016/0276884 A1    Sep. 22, 2016

(30) Foreign Application Priority Data

Jun. 11, 2013    (GB) .................................. 1310385.8

(51) Int. Cl.
*H02K 1/27*  (2006.01)
*H02K 7/08*  (2006.01)
(Continued)

(52) U.S. Cl.
CPC ................. *H02K 1/27* (2013.01); *B60K 7/00* (2013.01); *B60K 7/0007* (2013.01); *H02K 7/08* (2013.01);
(Continued)

(58) Field of Classification Search
CPC ......... B60K 7/0007; B60K 7/00; B60K 2007/0038; B60K 2007/0092; F16C 33/04;
(Continued)

(56) References Cited

U.S. PATENT DOCUMENTS

2004/0222706 A1*  11/2004  Ickinger ............... B29C 45/5008
                                                                   310/83
2009/0243301 A1*  10/2009  Longtin .................... F03D 7/02
                                                                   290/55
2013/0069462 A1*   3/2013  Calvert ................ B60K 7/0007
                                                                   310/88

FOREIGN PATENT DOCUMENTS

DE    3213172 A1    10/1983
EP    2106013 A2     9/2009
(Continued)

OTHER PUBLICATIONS

European Patent Office; International Search Report; dated Jun. 23, 1015; World Intellectual Property Organization; Rijswijk.
(Continued)

*Primary Examiner* — Naishadh N Desai
(74) *Attorney, Agent, or Firm* — Valerie M. Davis; The Mason Group Patent Specialists

(57) ABSTRACT

An electric motor or generator having a stator with stator teeth for mounting electrical coils and a rotor, wherein the stator has a first surface that is substantially perpendicular to an axis of rotation of the rotor and the rotor has a second surface that is formed in substantially the same radial position as the stator's first surface, wherein upon the rotor being pivoted perpendicular to the axis of rotation of the rotor the first surface and the second surface are arranged to prevent the rotor coming into contact with the stator teeth.

11 Claims, 4 Drawing Sheets

(51) Int. Cl.
  *B60K 7/00* (2006.01)
  *H02K 7/14* (2006.01)
(52) U.S. Cl.
  CPC ...... *H02K 7/088* (2013.01); *B60K 2007/0038* (2013.01); *B60K 2007/0092* (2013.01); *H02K 1/2786* (2013.01); *H02K 7/14* (2013.01); *H02K 2213/06* (2013.01)
(58) Field of Classification Search
  CPC .......... F16C 39/02; H02K 7/088; H02K 1/27; H02K 7/08; H02K 7/14; H02K 2213/06; H02K 1/2786
  See application file for complete search history.

(56) References Cited

FOREIGN PATENT DOCUMENTS

| | | |
|---|---|---|
| GB | 2472279 A | 2/2011 |
| JP | S6289450 A | 4/1987 |
| JP | 2003219600 A | 7/2003 |

OTHER PUBLICATIONS

Intellectual Property Office; Search Report; dated Jul. 1, 2013; Intellectual Property Office; South Wales.
European Patent Office; Written Opinion of the International Search Authority; dated Dec. 11, 2015; World Intellectual Property Organization; Rijswijk.
European Patent Office; Written Opinion of the International Searching Authority; dated Dec. 11, 2015; WIPO; Rijswijk.

\* cited by examiner

ELECTRIC MOTOR OR GENERATOR

The present invention relates to an electric motor or generator, in particular an electric motor or generator having a low friction touch-down pad.

Electric motors work on the principle that a current carrying wire will experience a force when in the presence of a magnetic field. When the current carrying wire is placed perpendicular to the magnetic field the force on the current carrying wire is proportional to the flux density of the magnetic field. Typically, in an electric motor the force on a current carrying wire is formed as a rotational torque.

Examples of known types of electric motor include the induction motor, brushless permanent magnet motor, switched reluctance motor and synchronous slip ring motor, which have a rotor and a stator, as is well known to a person skilled in the art.

To minimise the risk that the flux density between the stator and rotor will be significantly reduced, the gap between teeth on the stator, upon which are mounted current carrying coil windings, and the rotor is kept relatively small. However, as a result of the air gap between the rotor and stator being minimised, during operation of the electric motor, the rotor may occasionally strike the stator. This is typically as a result of the rotor being distorted or deformed by the torque being applied to the rotor and/or due to thermal expansion of the stator and/or the rotor and/or by shock loading on the electric motor, for example as may occur due to bearing distortion due to a curb strike in the case of an in-wheel electric motor.

In particular, the rotor on an in-wheel electric motor will typically experience increased loads as a result of forces placed upon the wheel when the vehicle to which the in-wheel electric motor and wheel are attached is being driven.

If contact between the rotor and stator does occur this will increase friction between the stator and rotor, thereby decreasing the efficiency of the motor. Further, for electric motors that have a rotor with permanent magnets, such as a synchronous permanent magnet electric motor, contact between the stator and the permanent magnets can result in the permanent magnets being damaged or destroyed, thereby reducing magnetic flux and consequently motor torque.

Additionally, contact between the stator and rotor can grind down outer sections of the stator causing shorting to occur between stator laminations, which can have a detrimental effect on eddy current flow in the stator.

It is desirable to improve this situation.

In accordance with an aspect of the present invention there is provided an electric motor or generator according to the accompanying claims.

Using a portion of the stator or rotor as a low friction touch-down area has the advantage of minimising frictional forces, during use, between the stator and rotor of an electric motor.

Additionally, by designing into the electric motor a touch-down portion that is designed to be the first point of contact between the stator and rotor, minimises the risk of damage to other parts of the stator and rotor, for example damage to permanent magnets and/or stator laminations.

The present invention will now be described, by way of example, with reference to the accompanying drawings, in which.

Figure 1:
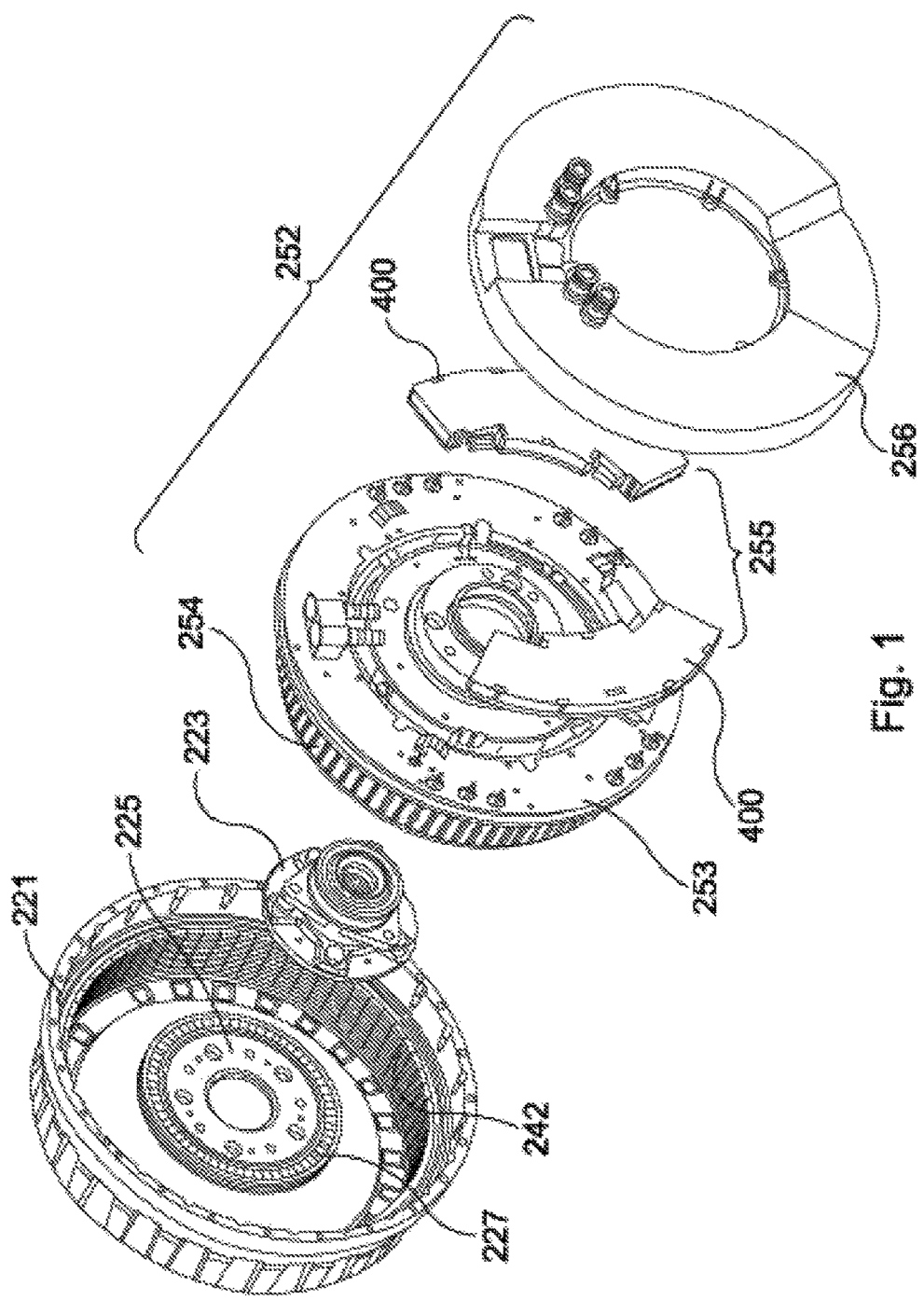
FIG. 1 illustrates an exploded view of a motor embodying the present invention.
Figure 2:
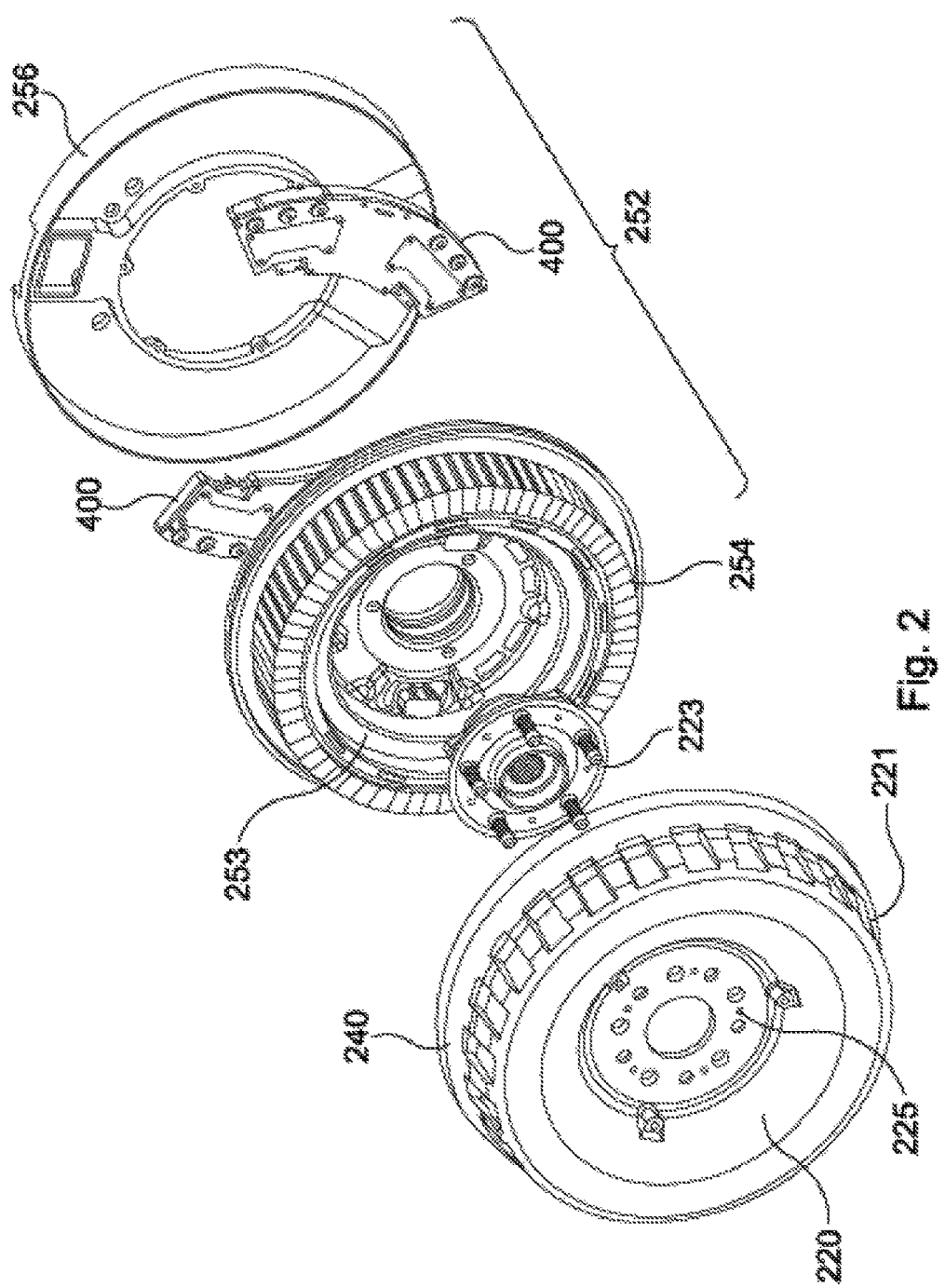
FIG. 2 is an exploded view of the motor of FIG. 1 from an alternative angle.

FIG. 1 and FIG. 2 illustrates an electric motor assembly incorporating an electric motor having a touch-down arrangement according to the present invention where the electric motor assembly includes built in electronics and is configured for use as a hub motor or in-wheel electric motor built to accommodate a wheel. However, the present invention could be incorporated in any form of electric motor. The electric motor can also be configured as a generator.

FIG. 2 shows an exploded view of the same assembly as FIG. 1 from the opposite side.

For the purposes of the present embodiment, as illustrated in FIG. 1 and FIG. 2, the in-wheel electric motor includes a stator 252 and a rotor 240. The stator 252 includes a main stator chassis 253 that incorporates a heat sink, multiple coils 254 and an electronics module 255 mounted in a rear portion of the main stator chassis 253 for driving the coils. The coils 254 are formed on stator tooth laminations to form coil windings. The stator teeth may be manufactured as part of the main stator chassis 253 or as separate elements that are mountable to the stator chassis 253. A stator cover 256 is mounted on the rear portion of the main stator chassis 253, enclosing the electronics module 255 to form the stator 252, which may then be fixed to a vehicle and does not rotate relative to the vehicle during use.

On a front surface of the main stator chassis 253, where the front surface is arranged to face the rotor when the rotor is mounted to the stator, is at least one raised surface, where the raised surface extends away from the front surface in the direction of the rotational axis of the electric motor. The raised surface may be formed as an integral part of the main stator chassis 253 during the manufacture of the stator. However, for the purposes of the present embodiment the raised surface is formed on a separate element that is mounted onto the main stator chassis 253 after the stator chassis has been manufactured, as described below.

For the purposes of the present embodiment, the electronics module 255 includes two control devices 400, where each control device 400 typically includes an inverter and control logic.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

When the rotor is mounted to the stator the magnets are arranged to be in close proximity to the coil windings on the stator 252 so that magnetic fields generated by the coils interact with the magnets 242 arranged around the inside of the cylindrical portion 221 of the rotor 240 to cause the rotor 240 to rotate. To ensure that the rotor can rotate around the stator without interference from the stator an air gap exists between the top surface of the laminated stator tooth 401 and the bottom surface of the magnets 242. A typical air gap would be in the region of 1.0 mm. As the permanent magnets 242 are utilized to generate a drive torque for driving the electric motor, the permanent magnets are typically called drive magnets.

Mounted on the inner side of the front portion 220 of the rotor 240, adjacent to the stator 252, is a raised annular disc portion, where the raised annular disc extends away from the front portion of the rotor in the direction of the rotational axis of the electric motor. The annular disc may be formed as an integral part of the rotor during the manufacture of the rotor. However, for the purposes of the present embodiment the annular disc is formed as a separate element that is mounted onto the rotor after the rotor has been manufactured, as described below.

As described below, the raised surface on the main stator chassis 253 and the raised annular disc on the rotor act as touchdown areas that are arranged to act as a contact point between the stator and rotor to prevent the rotor drive magnets making contact with the stator teeth should the rotor become distorted, deformed or tilted relative to the stator during use, thereby avoiding the risk of damage to the tooth laminations and/or the magnets 242.

Preferably at least one of the raised surface on the main stator chassis 253 and the raised annular disc on the rotor are made from low friction material, thereby allowing the raised surface on the main stator chassis 253 and the raised annular disc on the rotor to act as a touch down bearing.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

Although the raised surfaces on the main stator chassis 253 and the raised annular disc on the rotor prevent the rotor drive magnets coming into contact with the stator teeth, to reduce the occurrences of the touchdown surfaces coming into contact the tilting stiffness of the bearing is preferably selected to be above a predetermined stiffness based on specified design criteria. For example, by having a bearing with a tilting stiffness above 5500 Nm/deg this will minimise the risk of the touchdown surfaces coming into contact during vehicle cornering manoeuvres up to 1 g lateral acceleration that impart a lateral force on the rotor.

The rotor housing also includes a focusing ring and magnets 227 for position sensing.

A V shaped seal is provided between the circumferential wall 221 of the rotor and the outer edge of the stator housing 230.

Typically, to reduce weight while retaining structural strength the rotor housing and the main stator chassis 253 are made from an aluminium alloy.

Figure 3:
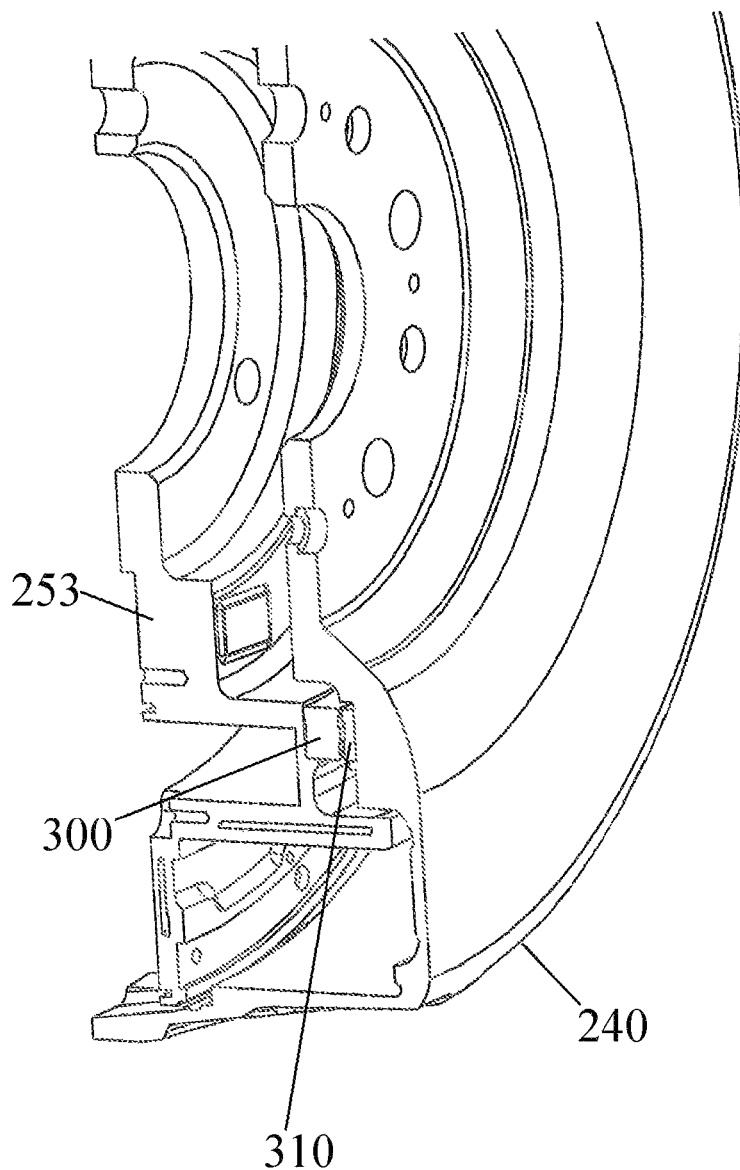
FIG. 3 illustrates a partial cross sectional view of the motor embodying the present invention.

As illustrated in FIG. 3, the raised surface 300, which acts as a touchdown surface, formed on the front surface of the main stator chassis 253, is arranged to have a radial position on the front surface that substantially corresponds to the radial position of the raised annular disc 310 that is formed on the inner surface of the front portion 220 of the rotor 240.

Although the raised surface 300 on the main stator chassis 253 and the raised annular disc 310 on the front portion 220 of the rotor 240 may be positioned at any radial position on the main stator chassis 253 and rotor 240 respectively, for the purposes of the embodiment illustrated in FIG. 3, the complementary raised surfaces 300, 310 on the main stator chassis 253 and the front portion 220 of the rotor 240 are located just within the radius of the stator teeth.

Preferably, however, it is desirable to have the touchdown surfaces located at the largest radius possible in an area of high structural stiffness. Should the touchdown surfaces come into contact, the further the touchdown surfaces are from the centre of rotation of the wheel bearing the lower the resultant loads will be on the touchdown surfaces.

As the air gap between the drive magnets mounted on the rotor 240 and the top surface of the stator teeth 401 is typically smaller than the gap between the adjacent surfaces on the rotor 240 and stator 252, which form a plane that is substantially perpendicular to the axis of rotation of the electric motor, by placing the touchdown bearing surfaces 300, 310 between adjacent surfaces on the rotor 240 and stator 252 the tolerance requirements for the sizing of the gap between the touchdown bearing surfaces 300, 310 is improved, thereby helping to simplify the manufacture of the touchdown bearing.

The tilting angular rotation of the bearing required for a touchdown condition between the rotor drive magnets and the stator teeth is a function of the relative positions of the bearing centre of rotation and the furthest potential clash position. The further the touchdown point from the tilting centre the larger the angular tilt required. For example, within the present embodiment, without the use of touchdown surfaces according to the present invention, if a touchdown between rotor drive magnets and stator teeth would occur at 1 degree of bearing tilt, having touchdown surfaces on the stator and rotor at a diameter of 300 mm with a gap between the touchdown surface being less than 3 mm would prevent a touchdown between rotor drive magnets and stator teeth occurring. Similarly, having touchdown surfaces on the stator and rotor at a diameter of 150 mm with a gap between the touchdown surfaces being less than 2 mm would prevent a touchdown between rotor drive magnets and stator teeth occurring. As such, touchdown between the stator teeth and the rotor drive magnets can be prevented using touchdown surfaces on the stator and rotor that lie in a plane substantially perpendicular to the electric motor's axis of rotation when the distance between the touchdown surfaces is greater than the distance between the closest point on the stator teeth and the rotor.

To optimize the contact area between the respective touchdown surfaces 300, 310 on the rotor 240 and stator 252, preferably the angle of the touchdown surface 300 on the stator is set to correspond to the angle of tilt that the rotor 240 is required to be tilted by for the annular disc 310 to make contact with the touchdown surface 300 on the stator 252, thereby ensuring that the respective touchdown surfaces 300, 310 on the stator 252 and rotor 240 are substantially parallel upon touchdown between the touchdown surfaces occurring.

Figure 4:
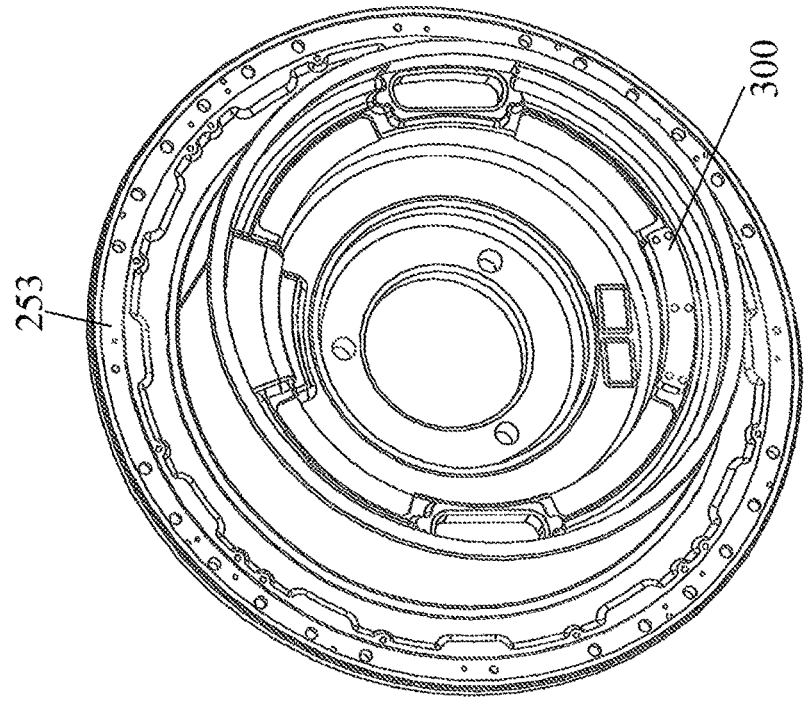
FIG. 4 illustrates a rotor and a stator according to an embodiment of the present invention.
Figure 4:
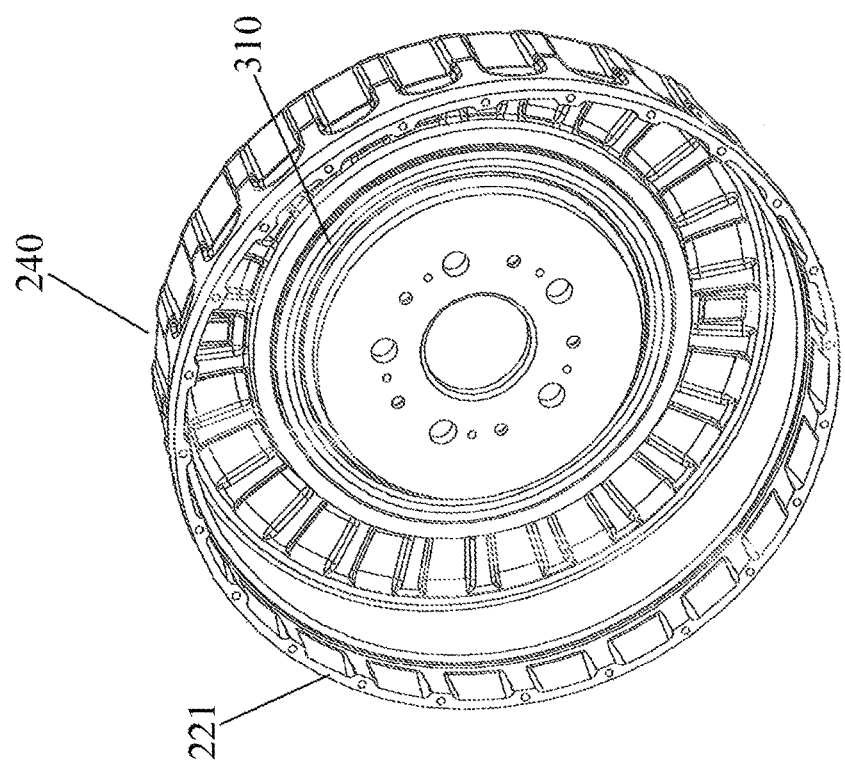

Although the raised surface 300 formed on the front surface of the main stator chassis 253 can be arranged to extend along a radial position on the main stator chassis 253 to form an annular disc, typically the raised surface 300 formed on the front surface of the main stator chassis 253 will have a length that corresponds to a segment of the raised annular disc 310 formed on the inner surface of the front portion of the rotor 240, as illustrated in FIG. 4. The raised surface 300 formed on the front surface of the main stator chassis 253 can be of any suitable length.

In an embodiment where the raised surface 300 formed on the front surface of the main stator chassis 253 has a length that corresponds to a segment of the raised annular disc 310 formed on the inner surface of the front portion of the rotor 240, the raised surface 300 on the stator 252 may be located in any radial position on the main stator chassis 253 around the radius defined by the radius of the annular disc on the rotor. Preferably, however, to minimize the risk of damage occurring upon a wheel attached to a rotor hitting a curb in a lateral direction to the wheel (i.e. a curb strike condition) the raised surface 300 formed on the front surface on the main stator chassis 253 is formed on a lower portion of the front surface, closer to the bottom of the stator 252 when the stator 252 is mounted to a vehicle.

Alternatively, a plurality of raised surfaces 300 may be formed on the front surface of the main stator chassis 253, where each raised surface 300 has a length that corresponds to a segment of the raised annular disc 310 formed on the rotor 240, with each raised surface segment arranged to prevent the rotor magnets coming into contact with the stator teeth at different orientations. For example, one raised surface 300 may be formed on the front surface of the stator main chassis 253 on a lower portion to prevent the rotor drive magnets coming into contact with the stator teeth as a result of a curb strike and another raised surface 300 may be formed on the front surface of the stator main chassis 253 on an upper portion to prevent the rotor drive magnets coming into contact with the stator teeth should the top portion of the rotor 240 be tilted inwardly relative to the vehicle.

To minimise friction between the stator 252 and the rotor 240 upon a touchdown event occurring, preferably a low friction material, for example nylon, plastics or other coating such as PTFE, Apticote, Teflon, or diamond like carbon DLL, is applied to the raised surface 300 on the stator 252 and/or the raised annular disc 310 on the rotor 240. Alternatively, where the raised surface 300 on the stator and the raised annular disc 310 on the rotor 240 are separate elements that are mounted to the stator and rotor respectively, the separate elements can be manufactured from low friction material. If a low friction material is applied/mounted on the rotor the frictional coefficient of the touchdown surface on the rotor may be lower than the frictional coefficient of the touchdown surface on the stator. Should a touchdown incident occur the use of a low friction material allows the touchdown surfaces 300, 310 to skid or slide with respect to each other, thereby keeping the frictional forces between the stator 252 and rotor 240 to a minimum.

The criteria as to whether to utilise low friction material on one or more of the touchdown surfaces 300, 310 may be made dependent upon the stiffness characteristic of the bearing used to mount an electric motor to a vehicle.

For example, if a bearing stiffness is selected that allows touchdown to occur between the electric motor's touchdown surfaces when the vehicle is experiencing maximum cornering loads, to minimise friction between the stator 252 and rotor 240 under these conditions it would be preferable for a low friction material to be applied to one or more of the touchdown surfaces 300, 310. If, however, a bearing stiffness is selected that prevents touchdown occurring between the electric motor's touchdown surfaces 300, 310 when the vehicle is experiencing maximum cornering loads it is likely that touchdown will only occur under abuse loads such as a curb strike condition, which would not occur during normal driving conditions and as such in this circumstance there would be no great benefit in low friction material being applied to the touchdown surfaces 300, 310.

Although the preferred embodiment utilises touchdown surfaces 300, 310 that are raised with respect to the respective surfaces on the stator 252 and rotor 240, any contact surface may be formed on the stator 252 and rotor 240. For example, the depth of the raised annular disc 310 on the rotor 240 may be selected to avoid the need for a raised surface 300 on the stator 252 or one or more recesses are machined in front surface of the main stator chassis 253 and a low-friction bearing, for example a low-friction polymer bearing, is inserted into each of the recesses. A part of the bearing's surface extends from the front surface of the main stator chassis 253 so that upon a touchdown incident occurring with the annular disc 310 on the rotor 240 this will allow the rotor 240 to skid or slid with respect to stator 252.

The invention claimed is:

1. An electric motor or generator comprising a rotor and a stator with stator teeth for mounting electrical coils, wherein the stator has a first surface that is on a plane that is substantially perpendicular to an axis of rotation of the rotor and the rotor has a second surface that is on a plane that is substantially perpendicular to the axis of rotation of the rotor and that is formed in substantially the same radial position as the first surface, wherein one or both of the first surface extends away from a front surface of the stator in the direction of the axis of rotation of the rotor or the second surface extends away from a front portion of the rotor and toward the first surface in the direction of the axis of rotation of the rotor, wherein the front surface of the stator is arranged to face the front portion of the rotor when the rotor is mounted to the stator, wherein upon the rotor being pivoted by an external force away from the perpendicular to the axis of rotation of the rotor, the first surface and the second surface are arranged to prevent the rotor coming into contact with the stator teeth.

2. An electric motor or generator according to claim 1, wherein the first surface is formed on a first element on the stator and/or the second surface is formed on a second element mounted on the rotor.

3. An electric motor or generator according to claim 2, wherein the first element has a lower frictional coefficient than the surface of the stator upon which the first element is mounted.

4. An electric motor or generator according to claim 2, wherein the second element has a lower frictional coefficient than the surface of the rotor upon which the second element is mounted.

5. An electric motor or generator according to claim 1, wherein the frictional coefficient of the second surface is lower than the frictional coefficient of the first surface.

6. An electric motor or generator according to claim 2, wherein the second element is an annular disc mounted on the rotor.

7. An electric motor or generator according to claim 1, wherein upon the rotor being pivoted away from the perpendicular to the axis of rotation such that the first surface comes into contact with the second surface, the first surface is arranged to be substantially parallel to the second surface.

8. An electric motor or generator according to claim 1 further comprising a bearing, wherein the bearing is arranged to inhibit the rotor being pivoted away from the perpendicular to the axis of rotation to prevent the first surface coming into contact with the second surface for forces in the direction of the axis of rotation being the result of less than 1 g lateral acceleration.

9. An electric motor or generator according to claim 2, wherein the first element and/or the second element are a low friction plastics.

10. An electric motor or generator according to claim 1, wherein the distance between the first surface and the second surface is greater than the distance between the closest point on the stator teeth and the rotor.

11. An electric motor or generator according to claim 1, wherein the rotor has permanent magnets mounted on a surface of the rotor opposite the stator teeth.

\* \* \* \* \*